(12) United States Patent
Tanaka

(10) Patent No.: US 9,754,621 B2
(45) Date of Patent: Sep. 5, 2017

(54) APPENDING INFORMATION TO AN AUDIO RECORDING

(71) Applicant: CASIO COMPUTER CO., LTD., Tokyo (JP)

(72) Inventor: Takahiro Tanaka, Machida (JP)

(73) Assignee: CASIO COMPUTER CO., LTD. (JP)

( * ) Notice: Subject to any disclaimer, the term of this patent is extended or adjusted under 35 U.S.C. 154(b) by 0 days.

(21) Appl. No.: 15/013,793

(22) Filed: Feb. 2, 2016

(65) Prior Publication Data

US 2016/0247533 A1    Aug. 25, 2016

(30) Foreign Application Priority Data

Feb. 25, 2015    (JP) ................................ 2015-035026

(51) Int. Cl.
| | | |
|---|---|---|
| *G10L 15/00* | (2013.01) | |
| *G11B 20/10* | (2006.01) | |
| *G10L 21/14* | (2013.01) | |
| *G11B 27/34* | (2006.01) | |
| *G11B 27/031* | (2006.01) | |

(52) U.S. Cl.
CPC ........ *G11B 20/10527* (2013.01); *G10L 21/14* (2013.01); *G11B 27/031* (2013.01); *G11B 27/34* (2013.01); *G11B 2020/10564* (2013.01)

(58) Field of Classification Search
USPC .................................. 704/231–257, 270–275
See application file for complete search history.

(56) References Cited

U.S. PATENT DOCUMENTS

| | | | | |
|---|---|---|---|---|
| 6,184,898 B1* | 2/2001 | Rice | ..................... | G01R 13/345 345/440 |
| 6,600,874 B1* | 7/2003 | Fujita | ..................... | G11B 20/10 386/249 |
| 2005/0010409 A1* | 1/2005 | Hull | ..................... | G06K 15/00 704/243 |
| 2005/0135782 A1* | 6/2005 | Ando | ..................... | G11B 27/034 386/231 |
| 2011/0306397 A1* | 12/2011 | Fleming | ................... | A63F 13/46 463/7 |
| 2013/0297308 A1 | 11/2013 | Koo et al. | | |

FOREIGN PATENT DOCUMENTS

| | | |
|---|---|---|
| JP | H9-98212 A | 4/1997 |
| JP | H09-146590 A | 6/1997 |
| JP | 2000-132187 A | 5/2000 |
| JP | 2009-145435 A | 7/2009 |
| JP | 2013-235556 A | 11/2013 |

OTHER PUBLICATIONS

Office Action dated on Jun. 21, 2016 for Japanese Patent Application No. 2015-035026 and English translation of the same. (10 pages).

\* cited by examiner

*Primary Examiner* — Jesse Pullias
(74) *Attorney, Agent, or Firm* — Fitch Even Tabin & Flannery LLP

(57) ABSTRACT

An audio recording apparatus comprises: a recording process for recording audio; a receiving process for receiving an indicated go-back time; and a processor that executes an information appending process that appends information associated with a time going back by the go-back time from a base time, linked to audio in the recording, in accordance with a user's instructions.

17 Claims, 15 Drawing Sheets

FIG. 6

| APPENDED INFORMATION | ASSOCIATED INFORMATION | IDENTIFICATION NUMBER | TIME |
|---|---|---|---|
| MARK ICON Im | ATTRIBUTE INFORMATION "IMPORTANT" | 0001 | 00:09:12 |
| MEMO ICON It | TEXT 0001 | 0002 | 00:13:04 |
| PHOTO ICON Ip | IMAGE 0003 | 0003 | 01:07:55 |
| PHOTO ICON Ip | IMAGE 0009 | 0004 | 00:24:28 |
| PHOTO ICON Ip | IMAGE 0007 | 0004 | 01:00:09 |
| MEMO ICON It | TEXT 0002 | 0004 | 01:37:47 |
| ⋮ | ⋮ | ⋮ | ⋮ |

17c

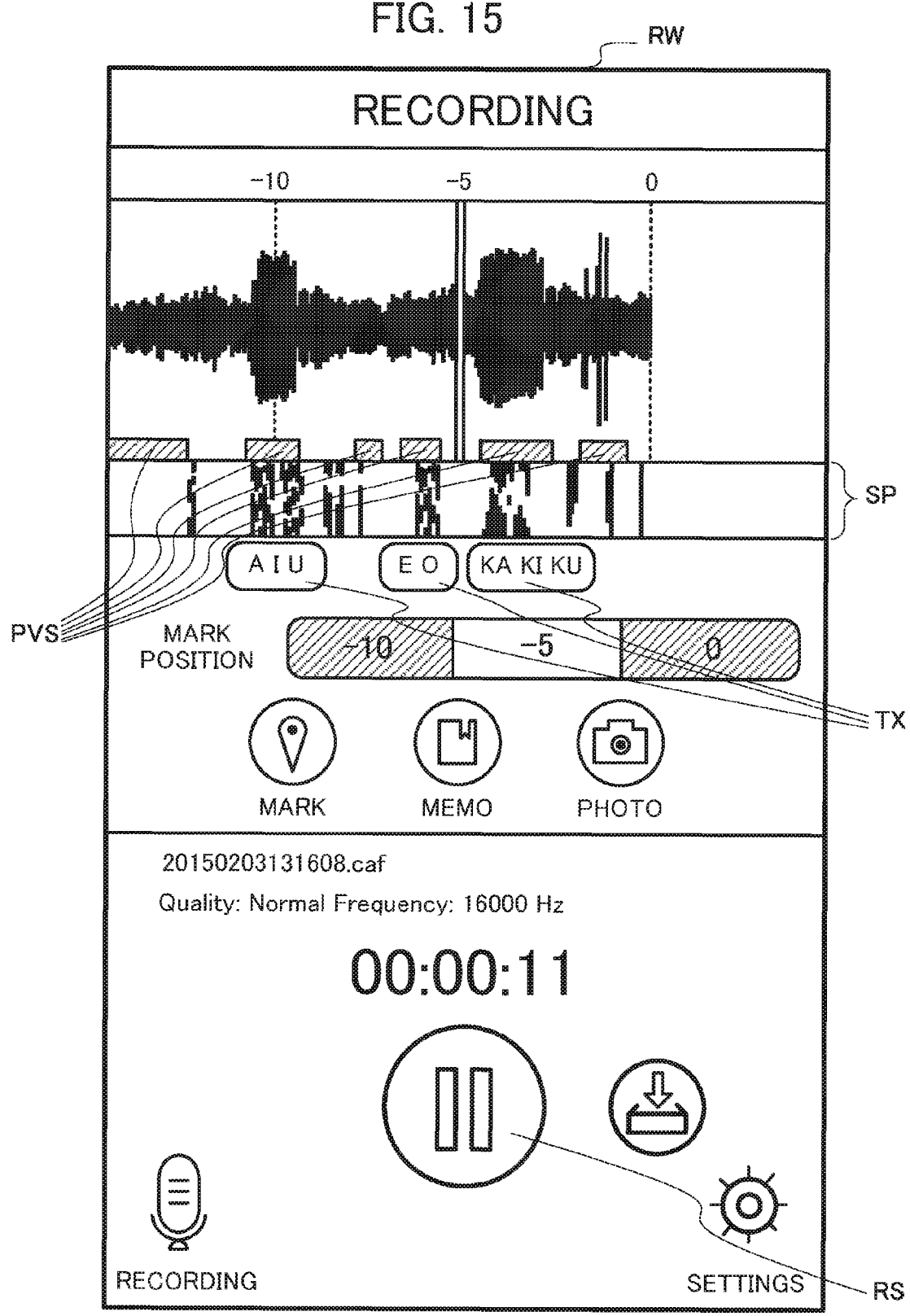

APPENDING INFORMATION TO AN AUDIO RECORDING

CROSS-REFERENCE TO RELATED APPLICATION

This application claims the benefit of Japanese Patent Application No. 2015-035026, filed on Feb. 25, 2015, the entire disclosure of which is incorporated by reference herein.

FIELD

This application relates generally to an audio recording apparatus, audio recording method and a non-transitory recording medium.

BACKGROUND

Technology for recording audio is commonly known. For example, in Patent Literature 1 (Unexamined Japanese Patent Application Kokai Publication No. H09-146590), art is disclosed that, in response to prescribed manipulation being accomplished during recording of audio, stores in memory audio recorded after a time going back by a prescribed time from the time when the prescribed manipulation was accomplished.

In addition, in Patent Literature 2 (Unexamined Japanese Patent Application Kokai Publication No. 2000-132187), art is disclosed that, in response to predetermined manipulation being accomplished during recording of audio, plays back audio recorded after a time going back by a prescribed time from the time when the prescribed manipulation was accomplished.

However, there were cases in which, during recording of audio at a lecture or conference, a user failed to hear contents spoken or was just a moment too late in recognizing that the spoken content was important.

In such cases, with the art disclosed in Patent Literature 1 and Patent Literature 2, in preparation for later playing back recorded audio, it was not possible to associate information that could specify locations missed during listening or locations that included important contents, with the audio recorded immediately prior, while recording the audio. Consequently, the problem existed that usability was poor to the user.

In consideration of the foregoing, it is an exemplary object of the present disclosure to provide an audio recording apparatus, audio recording method (and a non-transitory recording medium) that improve usability to the user during audio recording.

SUMMARY

In order to achieve the above object, the audio recording apparatus according to the present disclosure includes:

a processor configured to execute the following processes:

a recording process that records audio;

a receiving process that receives an indicated go-back time; and an information appending process that appends information associated with a time going back by the go-back time from a base time, linked to audio in the recording, in accordance with a user's instructions.

Advantageous Effects of Invention

With the present disclosure, it is possible to improve usability to the user during audio recording.

BRIEF DESCRIPTION OF THE DRAWINGS

A more complete understanding of this application can be obtained when the following detailed description is considered in conjunction with the following drawings, in which:

FIG. 6 is a diagram showing on example of display data;

FIG. 15 is a drawing showing one example of a recording screen displayed by the audio recording apparatus according to the second exemplary embodiment of the present disclosure.

DETAILED DESCRIPTION (First Exemplary Embodiment)

Below, an audio recording apparatus according to the present disclosure is described in detail.

An audio recording apparatus 1 has audio recording and playback functions, and during recording of audio, a user, by accomplishing a prescribed manipulation, can append appended information in accordance with the manipulation, associating such with audio recorded at a time going back by a prescribed time (go-back time) from the manipulation time (base time). Here, the appended information is information indicating attributes, text information (note information)

and/or image information, and icons associated with this appended information are displayed.

Figure 1:
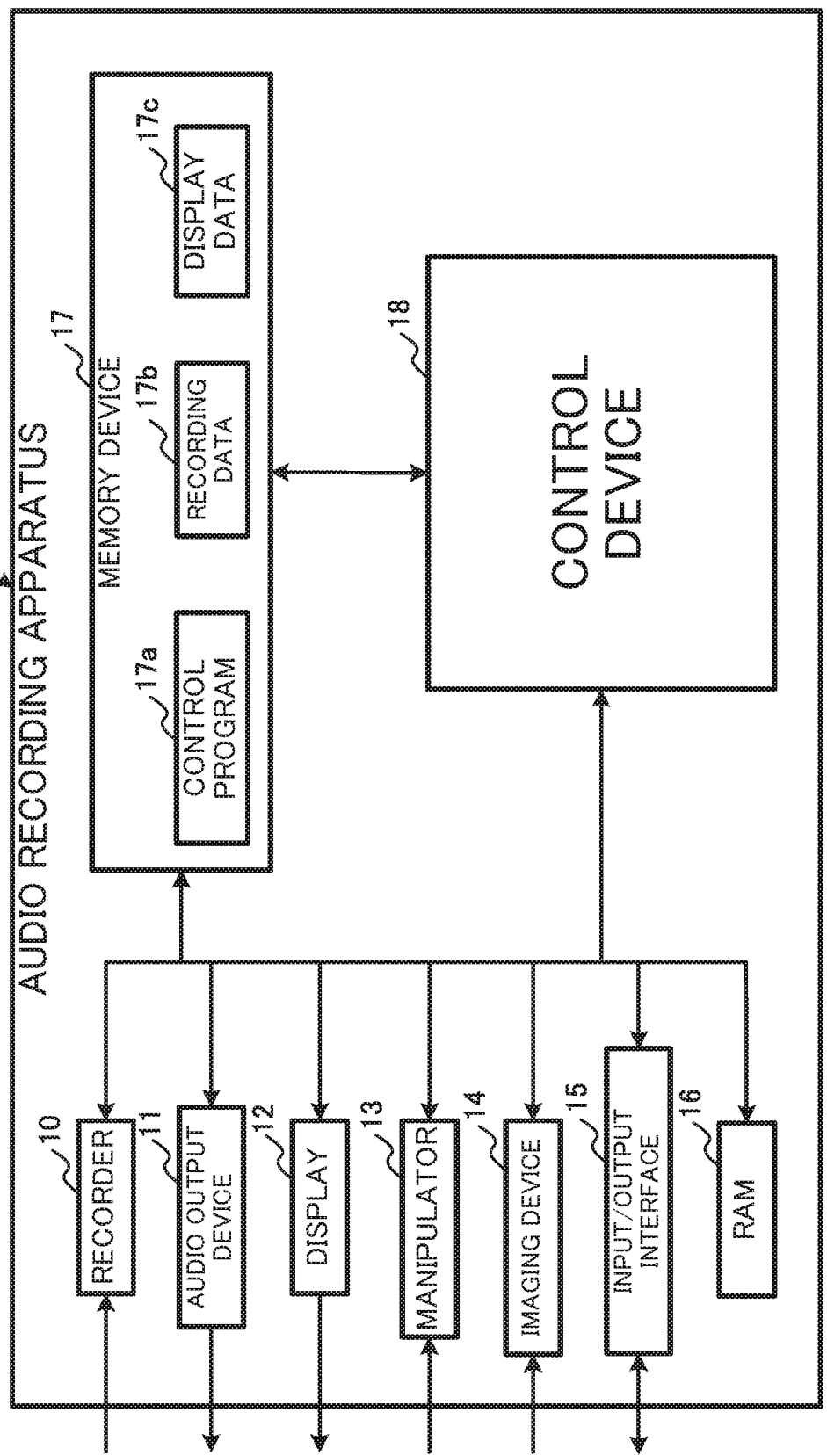
FIG. 1 a block diagram illustrating a configuration of an audio recording apparatus according to a first exemplary embodiment of the present disclosure.

As shown in FIG. 1, the audio recording apparatus 1 comprises a recorder 10, an audio output device 11, a display 12, a manipulator 13, an imaging device 14, an input/output interface 15, a RAM 16, a memory device 17 and a control device 18.

In FIG. 1, only a structure characteristic of the audio recording apparatus 1 according to this exemplary embodiment is shown. The audio recording apparatus 1 can be realized as a standalone voice recorder, but can also be realized by a PC or smartphone. When realized by a smartphone, a configuration similar to a regular smartphone is provided, such as a communication unit for executing telephone communication and email sending and receiving, a GPS device for measuring the unit's position, and/or the like.

The recorder 10 comprises a mic and records audio.

The recorder 10 acquires audio (analog audio signal) from outside via the mic, and converts the analog audio signal acquired into audio data (digital audio signal). Furthermore, recording data 17b is generated by associating a unique identification number with the audio data. The recorder 10 supplies the generated recording data 17b to the below-described memory device 17 and causes the data to be stored.

The audio output device 11 comprises a speaker and outputs audio.

The audio output device 11 reads the recording data 17b from the memory device 17 and acquires the audio data included in the recording data 17b. Furthermore, the audio output device 11 converts the audio data (digital audio signal) into audio (analog audio signal) and outputs such to the outside via the speaker.

The display device 12 comprises a display and displays various types of images in accordance with control by the control device 18.

A recording screen RW, a playback screen PW and various types of icons and information contained in these screens are included in the images displayed by the display device 12. These display contents are described in detail below.

The manipulator 13 receives manipulation by a user. The manipulator 13 supplies the manipulation received to the control device 18.

The manipulator 13 comprises a touch panel positioned overlapping the display comprising the display 12, a software keyboard displayed on the display, and various manipulation buttons of the audio recording apparatus 1.

The imaging device 14 comprises an optical lens and image sensor, and generates images by imaging a subject in accordance with control by the control device 18. The imaging device 14 supplies generated images to the memory device 17, and stores the images therein.

The input/output interface 15 sends data to and receives data from external devices.

Specifically, the input/output interface 15 converts various types of information including the recording data 17b and display data 17c stored by the memory device 17 into data in a Universal Serial Bus (USB) format, and sends information to and receives information from external devices via a USB cable.

The random access memory (RAM) 16 temporarily stores data and programs, and functions as a work memory for a central processing unit (CPU) comprising the below-described control device 18.

The memory device 17 comprises read-only memory (ROM) and rewritable non-volatile memory (for example, flash memory or a hard disk), and immovably stores data and programs.

The memory device 17 stores a control program 17a necessary for controlling the audio recording apparatus 1 as a whole in the ROM. In addition, the memory device 17 stores various types of application programs, including an audio recording and playback application program, in the rewritable non-volatile memory.

In addition, the memory device 17 stores the recording data 17b supplied from the recorder 10.

In addition, the memory device 17 stores the display data 17c generated by the control device 18. The display data 17c is described in detail below.

The control device 18 comprises a central processing unit (CPU), and controls the audio recording apparatus 1 as a whole by executing the control program 17a stored in the memory device 17.

Figure 2:
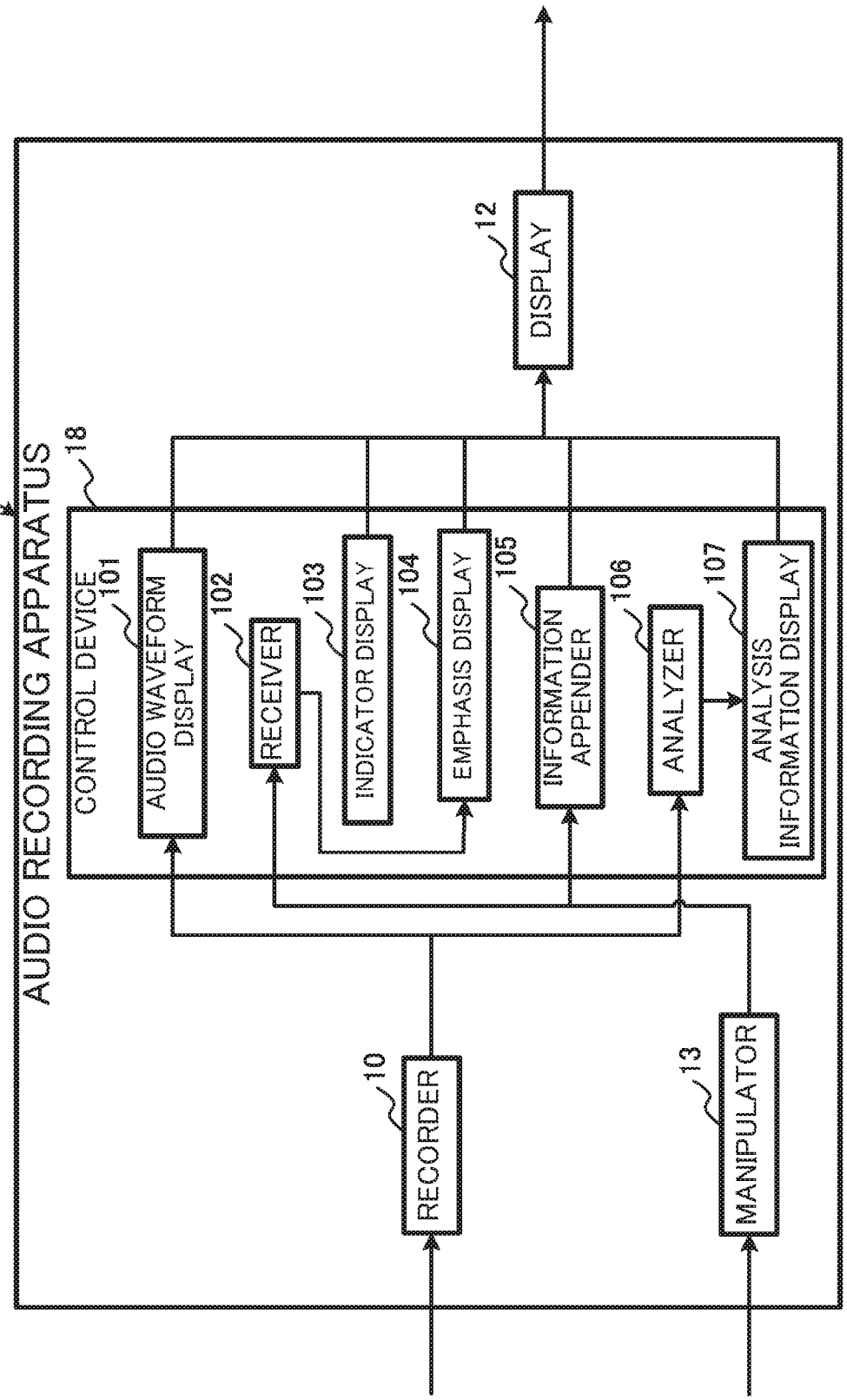
FIG. 2 is a block diagram illustrating a functional configuration of the audio recording apparatus.

By executing the audio recording and playback application program stored in the memory device 17, the control device 18 functions as an audio waveform display 101, a receiver 102, an indicator display 103, an emphasis display 104, an information appender 105, an analyzer 106 and an analysis information display 107, as shown in FIG. 2.

The audio waveform display 101 displays, while the recorder 10 is recording audio, the audio waveform of that audio, on the display 12.

A horizontal axis of an audio waveform SW indicates time, and a vertical axis indicates an amplitude of the audio (magnitude of the sound). The audio waveform display 101 acquires recorded audio from the recorder 10, generates waveform drawing data based on the acquired audio, and supplies the data to the display 12. The display 12 displays the audio waveform SW on the basis of the waveform drawing data supplied.

Figure 3:
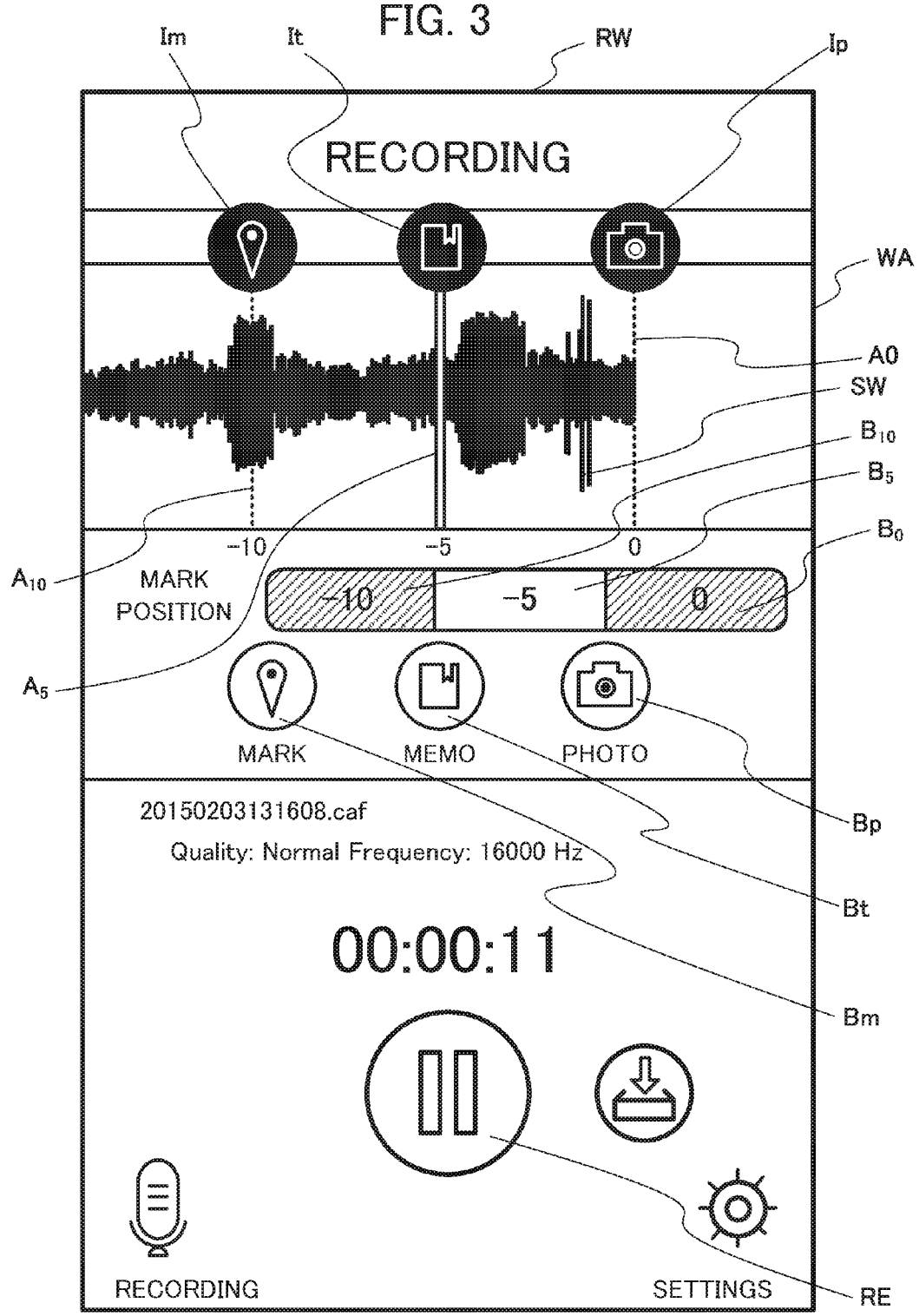
FIG. 3 is a diagram showing a first display example of a recording screen displayed by the audio recording apparatus.

As shown in FIG. 3, the recording screen RW displayed in the display by the display 12 displays: a waveform area WA in which the audio waveform SW is displayed; indicator buttons $B_0$, $B_5$ and $B_{10}$ for indicating "0 second", "−5 seconds" and "−10 seconds" as go-back times, below the waveform area WA; a mark button Bm indicating appended information; a memo button Bt; and a photograph button Bp.

The receiver 102 receives go-back times in accordance with the indicator buttons $B_0$, $B_5$ and $B_{10}$ manipulated by the user.

The indicator display 103 displays indicators respectively corresponding to the plurality of go-back times, along with the audio waveform SW in the waveform area WA.

As shown in FIG. 3, the indicator display 103 displays line-shaped indicators $A_0$, $A_5$ and $A_{10}$ corresponding respectively to the go-back times "0 second", "−5 seconds" and "−10 seconds". The indicator $A_0$ shows the current time, the indicator $A_5$ shows five seconds before the current time, and the indicator $A_{10}$ shows 10 seconds before the current time.

When any of the indicator buttons $B_0$, $B_5$ or $B_{10}$ is pressed by the user, the receiver 102 receives as the indicated go-back time the go-back time corresponding to the indicator button that was pressed. For example, when the indicator button $B_5$ is pressed, the go-back time "−5 seconds" is received by the receiver 102.

The emphasis display 104 emphasizes the indicator corresponding to the indicated go-back time received by the receiver 102, for example displaying such in bold.

For example, when the indicator button $B_5$ is pressed, the emphasis display 104 displays the line of the indicator $A_5$ corresponding to "−5 seconds" bolder (displays with more emphasis) than the other indicators $A_0$ and $A_{10}$, as shown in FIG. 3.

The information appender 105 displays icons of appended information at positions going back by the indicated go-back time from the base time, on the audio waveform SW displayed in the display 12.

As shown in FIG. 3, the information appender 105 displays a mark icon Im, a memo icon It and a photo icon Ip, in accordance with the mark button Bm, the memo button Bt and the photo button Bp. The mark icon Im is an icon with which attribute information is associated. The memo icon It is an icon with which text is associated. The photo icon Ip is an icon with which an image is associated.

In this exemplary embodiment, the base time is the time when the user pressed any out of the mark button Bm, the memo button Bt or the photo button Bp in the recording screen RW shown in FIG. 3.

When the user presses the mark button Bm, for example, the information appender 105 displays the mark icon Im, at a position going back by the go-back time from the time when pressing happened (the base time), on the audio waveform SW.

The analyzer 106 analyzes audio recorded by the recorder 10 and acquires analysis information. The analysis information display 107 displays this analysis information along with the audio waveform SW displayed on the display 12.

After recording of audio has concluded, the analyzer 106 acquires audio segments including a voice produced by a person (vocal segments) as analysis information, by implementing a vocal segment detection process on the audio that was recorded. After recording of audio has concluded, the analyzer 106 detects vocal segments in accordance with arbitrary commonly known technology, using a threshold value acquired on the basis of all audio data acquired by the recorder 10.

Below, an operation in which the audio recording apparatus 1 having the above-described configuration executes an audio recording process is described in detail with reference to FIG. 4 through FIG. 6.

Although omitted from the description, when the audio recording apparatus 1 is realized by a smartphone, besides the audio recording process the smartphone is capable of executing various operations such as telephone communication, sending and receiving email, browsing Web pages, and/or the like, the same as regular smartphones.

The user who desires to execute the audio recording process starts the audio recording and playback application program by manipulating the manipulator 13 with which the audio recording apparatus 1 is provided.

When an instruction is received via the manipulator 13, the control device 18 reads the audio recording and playback application program from the memory device 17 and deploys the program to the RAM 16.

Figure 4:
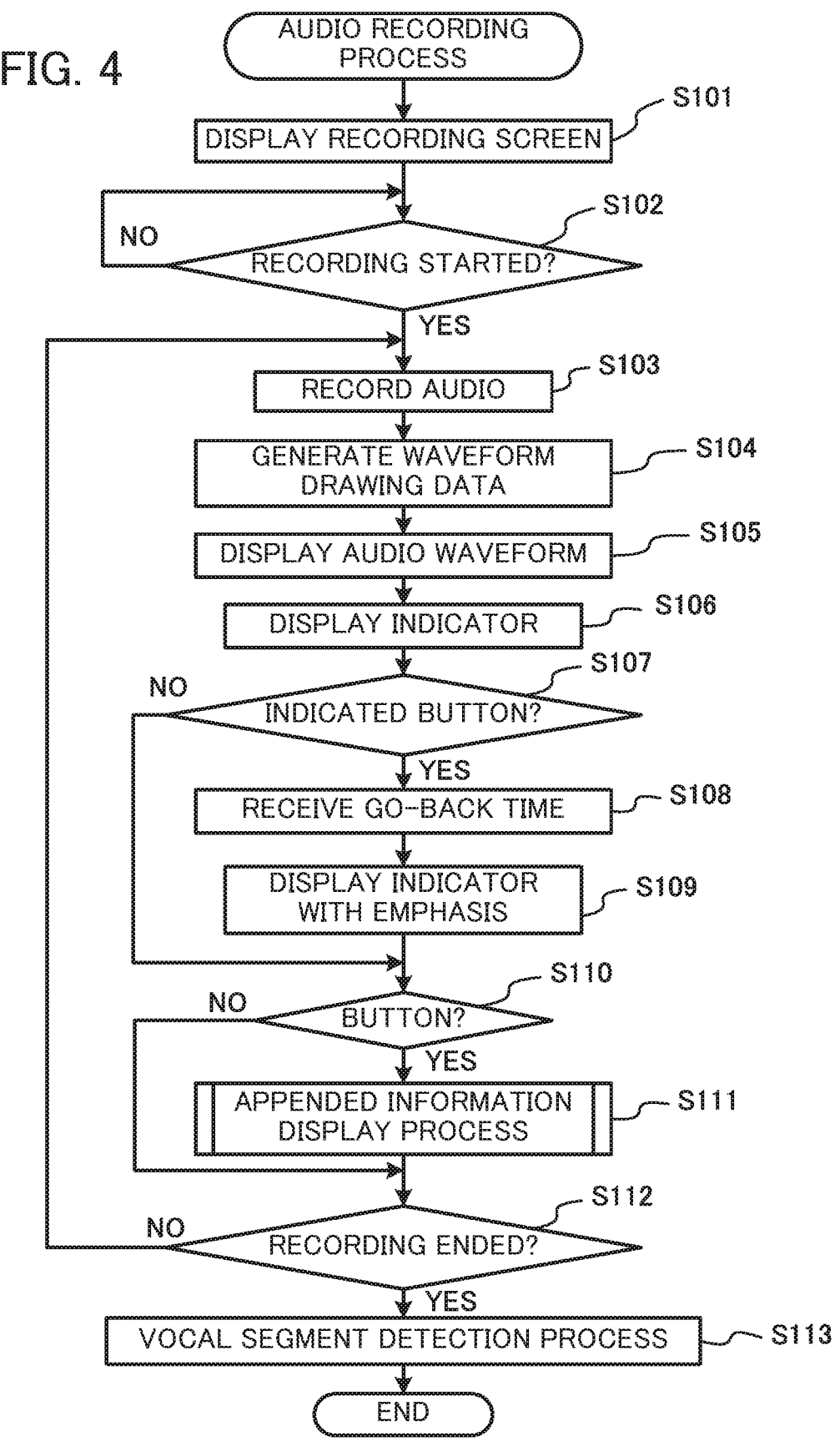
FIG. 4 is a flowchart for describing an audio recording process executed by the audio recording apparatus.

In a state in which the audio recording and playback application program has been launched, the control device 18 starts the audio recording process shown in the flowchart of FIG. 4 when the user selects an "audio recording mode" that is one of a plurality of operating modes with which the audio recording and playback application program is provided, by manipulating the manipulator 13.

When the audio recording process starts, first the recording screen RW is displayed on the display 12 (step S101) and the process waits until a recording start button RS is pressed (step S102).

When it is determined that the recording start button RS has been pressed (step S102: Yes), recording of audio by the recorder 10 is started (step S103).

The audio waveform display 101 generates waveform drawing data on the basis of audio recorded in step S103, supplies this data to the display 12 (step S104), and displays the audio waveform SW (step S105). In addition, the audio waveform display 101 supplies the generated waveform drawing data to the memory device 17 and causes the data to be stored.

The indicator display 103 displays the indicators $A_0$, $A_5$ and $A_{10}$ corresponding to the plurality of go-back times along with the audio waveform SW in the waveform area WA (step S106).

Next, a determination is made as to whether or not any of the indicator buttons $B_0$, $B_5$ and $B_{10}$ has been pressed (step S107). When it is determined that none of the indicator buttons has been pressed (step S107: No), the process moves to step S110.

When it is determined that any of the indicator buttons has been pressed (step S107: Yes), the go-back time corresponding to the indicator button that was pressed is received by the receiver 102 (step S108). Then, the emphasis display 104 displays with emphasis the line-shaped indicator corresponding to the go-back time received by the receiver 102 in step S108, out of the indicators $A_0$, $A_5$ and $A_{10}$ (step S109).

Next, a determination is made as to whether or not any out of the mark button Bm, the memo button Bt and the photo button Bp has been pressed (step S110). When it is determined that none have been pressed (step S110: No), the process moves to step S112.

When it is determined that any out of the mark button Bm, the memo button Bt and the photo button Bp has been pressed (step S110: Yes), the information appender 105 executes an appended information display process (step S111) and displays an icon corresponding to the appended information on the audio waveform SW.

Details of the appended information display process of step S111 are described with reference to the flowchart in FIG. 5.

In the appended information display process, first the time when the aforementioned button was pressed is acquired as the base time (step S201). Then, a determination is made as to whether or not the button that was pressed is the mark button Bm (step S202). When the determination is that it was not the mark button Bm (step S202: No), the process moves to step S203.

When it is determined that the mark button Bm was pressed (step S202: Yes), selection of attribute information corresponding to the mark icon Im by the user is received (step S212).

In this exemplary embodiment, it is possible for any out of three types of attribute information, namely "Important", "Forget" and "Not Understand" to be associated with the mark icon Im. The control device 18 displays a menu screen MW for the user to select any of the three types of attribute information, on the display 12 overlapping the recording screen RW, in accordance with the fact that the mark button Bm was pressed. When the user selects attribute information on the menu screen MW by manipulating the manipulator 13, the control device 18 receives that selection via the manipulator 13.

The information appender 105 displays the mark icon Im and an attribute icon If indicating attribute information at a position going back by the indicated go-back time on the audio waveform SW displayed on the display 12, that is to say at a position on the audio waveform SW where the indicator emphasized when the mark button Bm was pressed is shown (step S213). Then, the display data 17c is generated (step S207), the generated display data 17c is supplied to and stored in the memory device 17, and the appended information display process is concluded.

Here, the display data 17c is information for displaying the appended information on the audio waveform SW displayed on the display 12.

As shown in FIG. 6, the display data 17c includes and associates with each other the type of appended information, information corresponding to the appended information, and the position where the appended information is displayed. The position where the appended information is displayed is shown by an identification number of the audio data and a time in the audio data corresponding to a position on the audio waveform SW.

For example, the first item of display data 17c shown in FIG. 6 indicates that the "mark icon Im" to which the "attribute information 'Important'" corresponds is displayed at a position where "00 hours, 09 minutes, 12 seconds" has elapsed from the recording start time, on the audio waveform SW of the audio data to which the identification number "0001" was assigned.

When the display data 17c is generated in step S207, the attribute information for which a selection was received in step S212 is stored in the display data 17c as information corresponding to the mark icon Im. In addition, the position where the data was displayed on the audio waveform SW in step S213 is stored in the display data 17c as the position where the mark icon Im is displayed.

Figure 5:
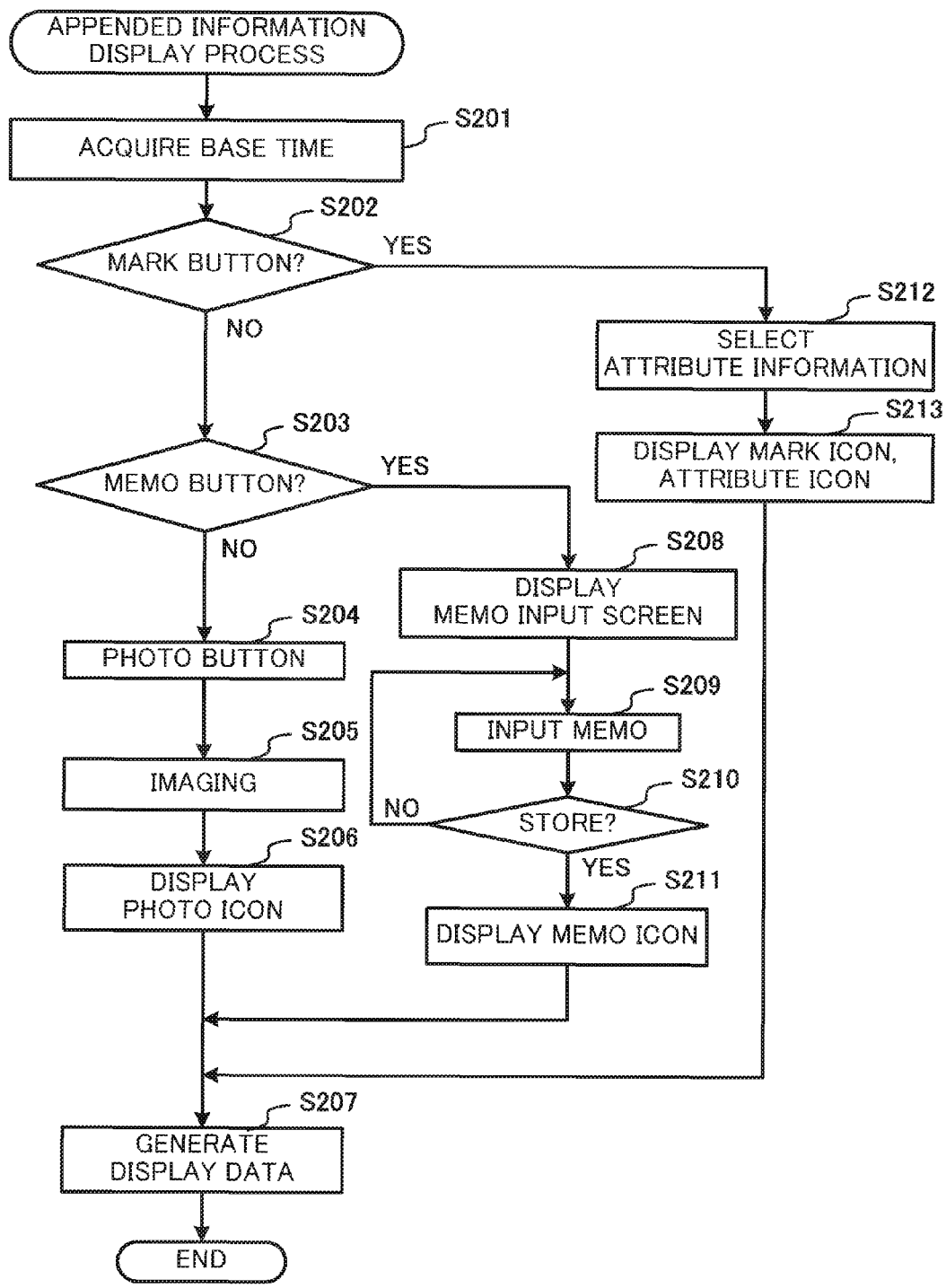
FIG. 5 is a flowchart for describing an appended information display process executed by the audio recording apparatus.

Returning to the flowchart of FIG. 5, in step S203 a determination is made as to whether or not the memo button Bt was pressed.

When it is determined that the memo button Bt was pressed (step S203: Yes), a memo input screen for the user to input a memo (text) is displayed on the display 12, overlapping the recording screen RW (step S208). Then, input of a memo by the user is received via the manipulator 13 (step S209), and a determination is made as to whether or not there was a command to store the memo input by the user (step S210). When it is determined that storage of the memo has not been commanded (step S210: No), the process returns to step S209.

When it is determined that storage of the memo was commanded (step S210: Yes), the information appender 105 displays the memo icon It at the position on the audio waveform SW indicated by the indicator emphasized at the time the memo button Bt was pressed, at the indicated go-back time position on the audio waveform SW (step S211). Then, the display data 17c is generated (step S207), the generated display data 17c is supplied to and stored in the memory device 17, and the appended information display process is concluded.

When the display data 17c is generated in step S207, the memo (text) associated with input in step S209 is stored in the display data 17c as information associated with the memo icon It, and the position when displayed on the audio waveform SW is also stored.

When it is determined that the mark button Bm was not pressed (step S202: No) nor was the memo button Bt pressed (step S203: No), this means that the photo button Bp was pressed.

Accordingly, when it is determined in step S203 that the memo button Bt was not pressed (step S203: No), it is determined that the photo button Bp was pressed (step S204), so the imaging device 14 is controlled, causing a subject to be imaged and an image to be generated (step S205).

The information appender 105 displays the photo icon Ip at the indicated go-back time position on the audio waveform SW displayed on the display 12 (step S206). Then, the display data 17c is generated (step S207), the generated display data 17c is supplied to and stored in the memory device 17, and the appended information display process is concluded.

When the display data 17c is generated in step S207, the image generated in step S205 is stored in the display data 17c as information associated with the photo icon Ip. In addition, the position when the data is displayed on the audio waveform SW in step S206 is stored in the display data 17c as the position where the photo icon Ip is displayed.

Returning to the flowchart in FIG. 4, after the appended information display process of step S111 is concluded, a determination is made as to whether or not a command to conclude audio recording was received via the manipulator 13 (step S112). When it is determined that a command to conclude audio recording was not received (step S112: No), the process returns to step S103.

When it is determined that a command to conclude audio recording was received (step S112: Yes), the vocal segment detection process is implemented on the audio recorded by the analyzer 106 (step S113), and the audio recording process concludes.

In the vocal segment detection process of step S113, the analyzer 106 detects vocal segments in accordance with arbitrary commonly known technology, using a threshold value acquired on the basis of all of the audio data acquired through the recorder 10. Information indicating detected vocal segments is supplied to and stored in the memory device 17 as analysis information.

Below, the above-described audio recording process is described in detail with reference to FIG. 7 through FIG. 11, taking as an example a case in which a lecture is recorded at school.

Figure 7:
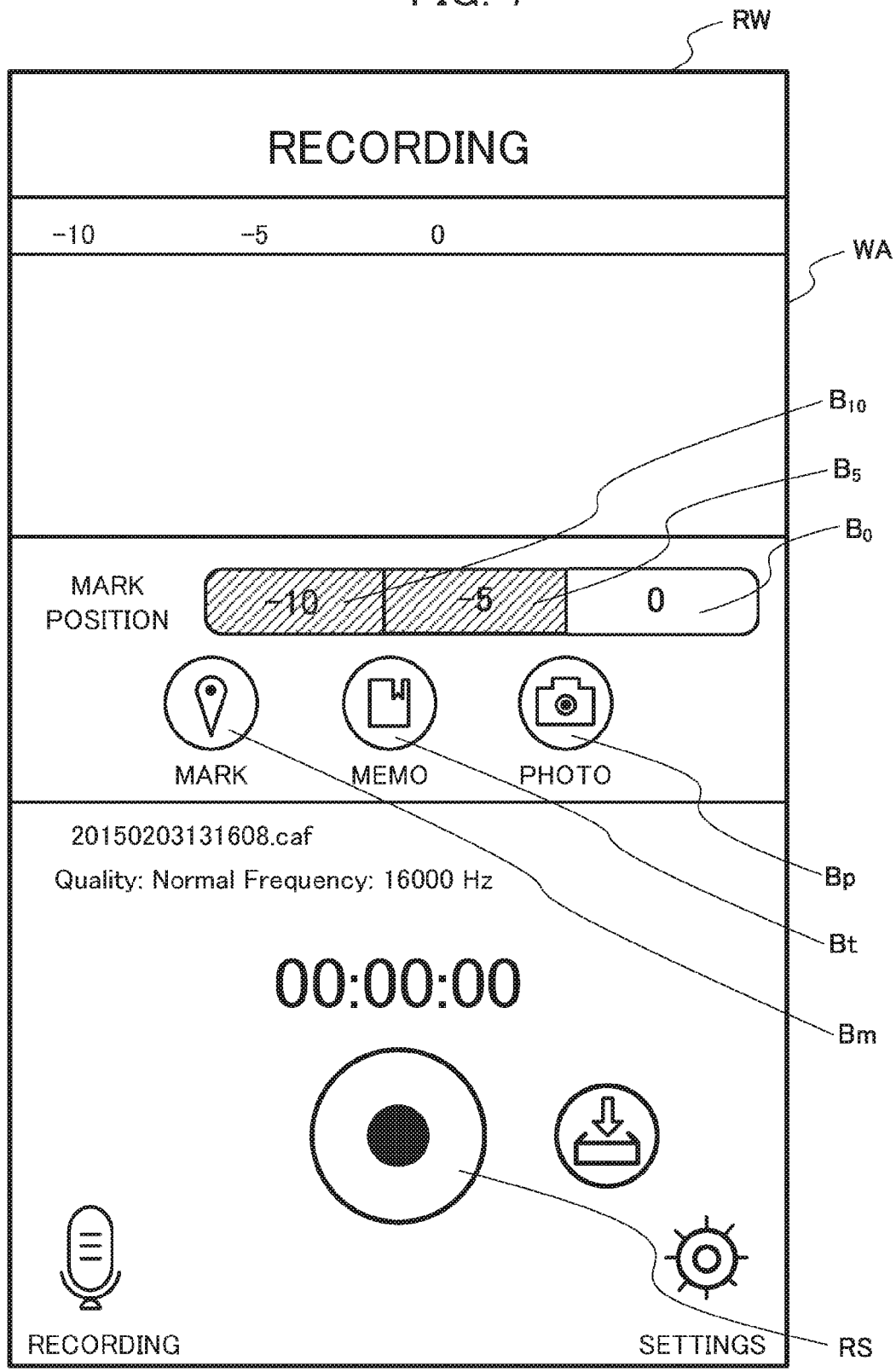
FIG. 7 is a diagram showing a second display example of a recording screen displayed by the audio recording apparatus.

When the audio recording process starts, first the recording screen RW shown in FIG. 7 is displayed in the display 12 (step S101), and a determination is made as to whether or not the recording start button RS has been pressed (step S102).

When it is determined that the recording start button RS was pressed (step S102: Yes), recording of audio in the recorder 10 is started (step S103).

Figure 8:
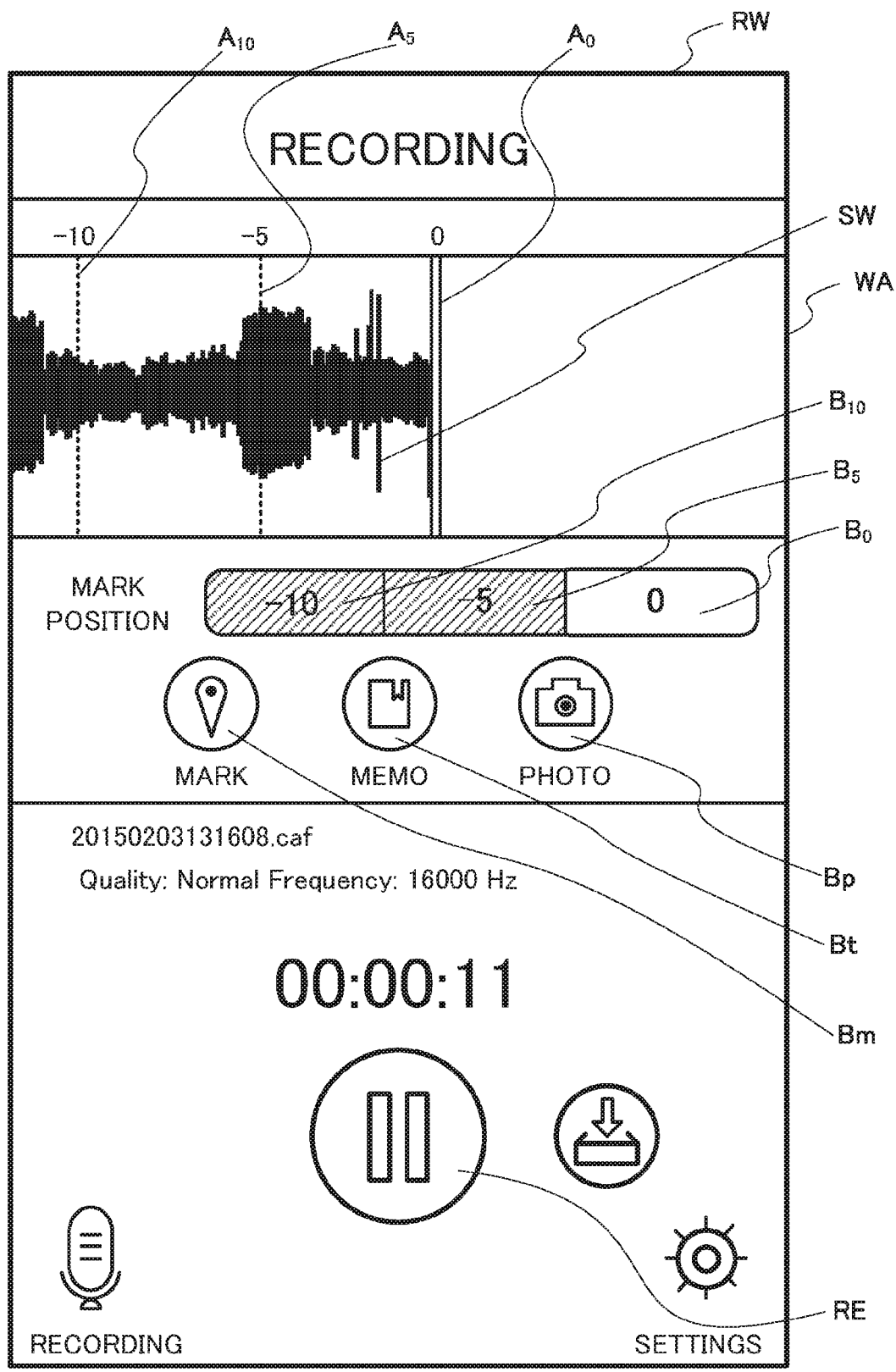
FIG. 8 is a diagram showing a third display example of a recording screen displayed by the audio recording apparatus.

The audio waveform display 101 generates and supplies to the display 12 the waveform drawing data on the basis of the audio recorded in step S103 (step S104), and as shown in FIG. 8, causes the audio waveform SW to be displayed in the waveform area WA (step S105). In addition, the audio waveform display 101 supplies the generated waveform drawing data to the memory device 17 and stores the data in the memory device 17.

The indicator display 103 displays the indicators $A_0$, $A_5$ and $A_{10}$ corresponding to go-back times along with the audio waveform SW in the waveform area WA, as shown in FIG. 8 (step S106).

In this exemplary embodiment, "0 second" is set by default as the indicated go-back time, and the indicator $A_0$ corresponding to the indicated go-back time "0 second" is displayed in bold for emphasis.

Next, a case in which the user has pressed the indicator button $B_{10}$ in order to change the indicated go-back time is described.

When it is determined that the indicator button $B_{10}$ was pressed (step S107: Yes), the receiver 102 receives the go-back time "−10 seconds" (step S108). Then, the emphasis display 104 displays the indicator $A_{10}$ corresponding to "−10 seconds" in bold for emphasis, as shown in FIG. 9 (step S109).

Figure 9:
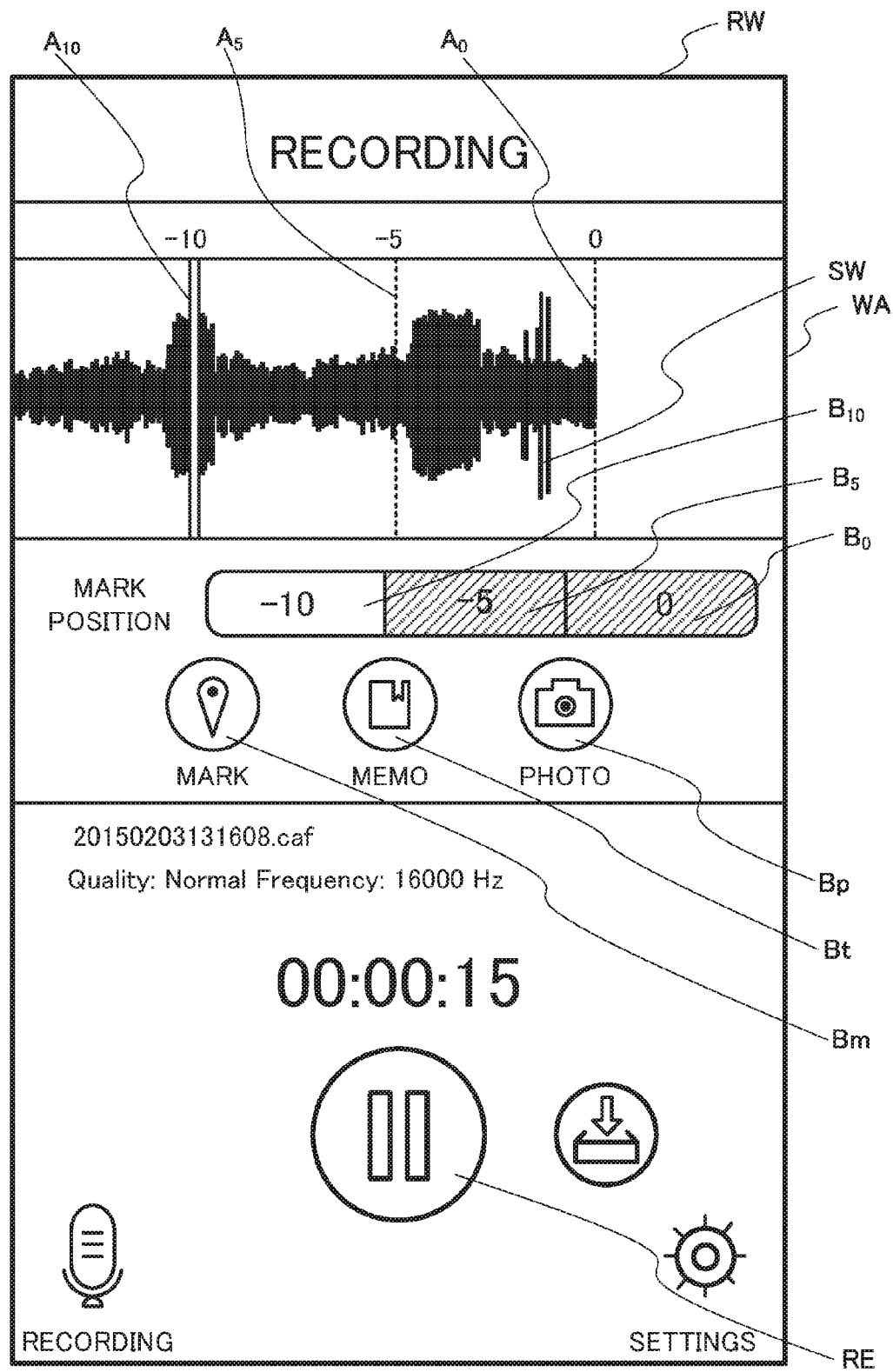
FIG. 9 is a diagram showing a fourth display example of a recording screen displayed by the audio recording apparatus.

In this exemplary embodiment, the indicator button that was pressed (here, the indicator button $B_{10}$) is displayed brightly, as shown in FIG. 9.

Next, suppose that the user is listening to the lecture and something important has been said. The user notices the audio waveform in the recording at this time, and presses the button Bm when the audio waveform has moved by 10 seconds in the waveform area WA and the emphasis indicator $A_{10}$ is reached.

When it is determined that the mark button Bm was pressed (step S110: Yes), the appended information display process is executed (step S111).

In the appended information display process, first the time when the mark button Bm was pressed is acquired as the base time (step S201). Then, a determination is made that the button icon that was pressed is the mark button Bm (step S202: Yes), and selection of the attribute information corresponding to the mark icon Im by the user is received (step S212).

Figure 10:
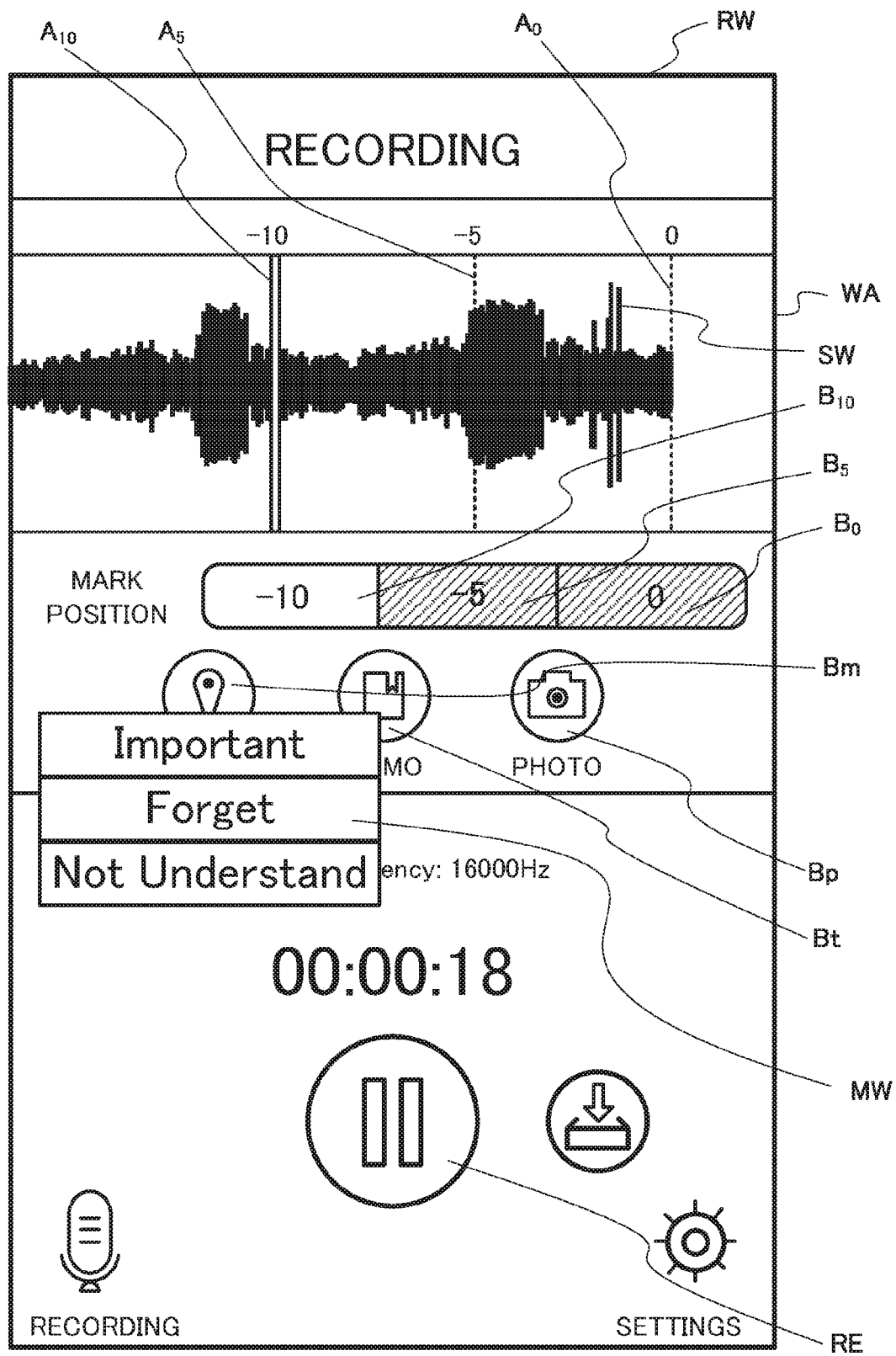
FIG. 10 is a diagram showing a fifth display example of a recording screen displayed by the audio recording apparatus.

Specifically, as shown in FIG. 10, because the menu screen MW is displayed overlapping the recording screen RW, the user selects one out of the three types of attribute information ("Important", "Forget" and "Not Understand").

Here, the explanation will assume that the user selected the attribute information "Important" as the attribute information corresponding to the mark icon Im.

Figure 11:
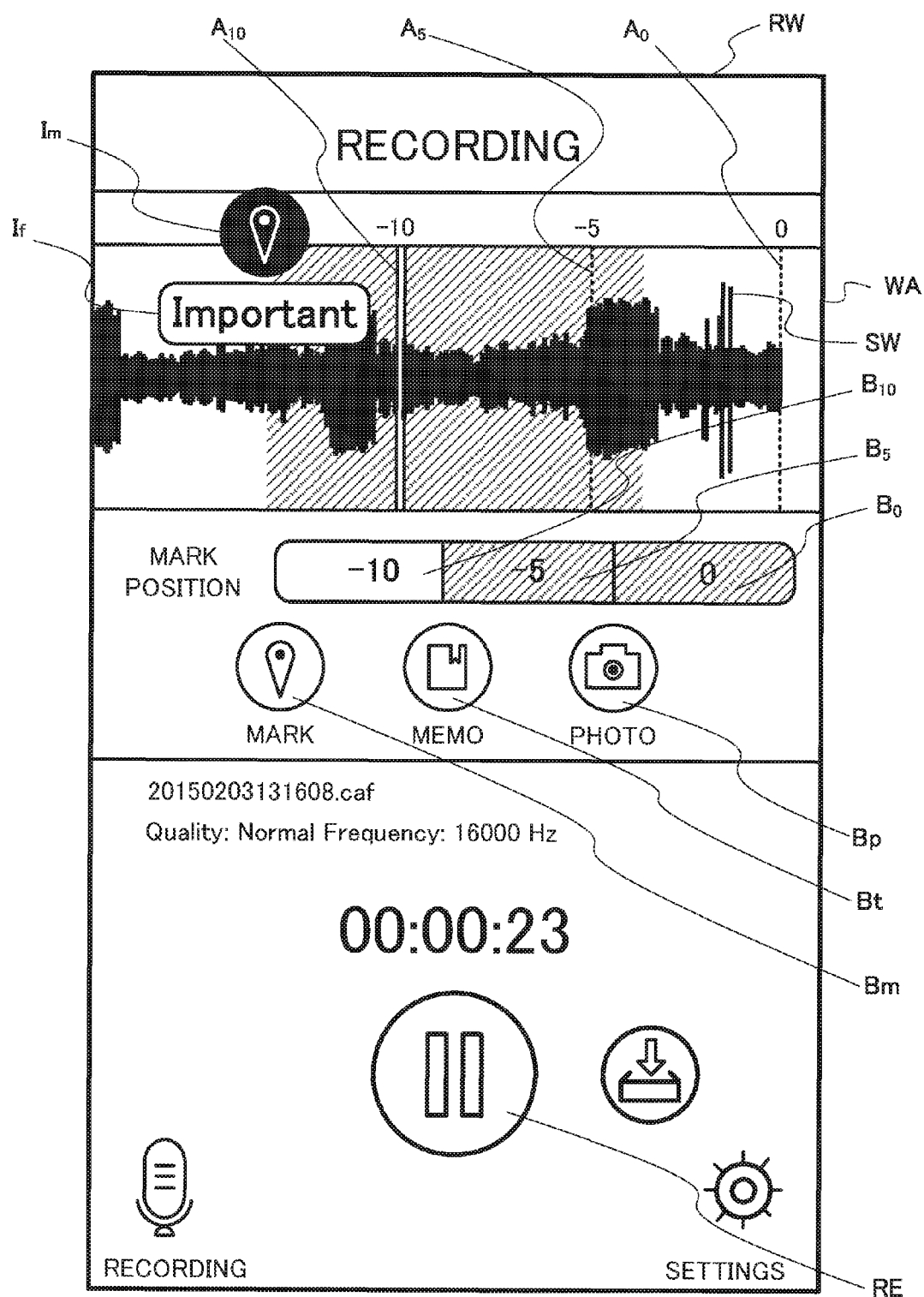
FIG. 11 is a diagram showing a sixth display example of a recording screen displayed by the audio recording apparatus.

As shown in FIG. 11, the mark icon Im and the attribute icon If indicating the attribute information "Important" are displayed at a position on the audio waveform SW going back by an indicated go-back time from the base time (step S213).

In this exemplary embodiment, the segment of the interval between the base time and the mark icon Im and the attribute icon If is displayed with half-tone shading on the audio waveform SW displayed in the display 12, as shown in FIG. 11.

Then, the display data 17c is generated (step S207), the generated display data 17c is supplied to and stored in the memory device 17, and the appended information display process concludes.

After the appended information display process is executed, a determination is made as to whether or not a command to conclude audio recording was received (step S112), and when there is no command to conclude audio recording, recording and the display of the audio waveform continue.

When a command to conclude audio recording is received (step S112: Yes), the analyzer 106 implements a vocal segment detection process on the recorded audio (step S113), and the audio recording process concludes.

Figure 12:
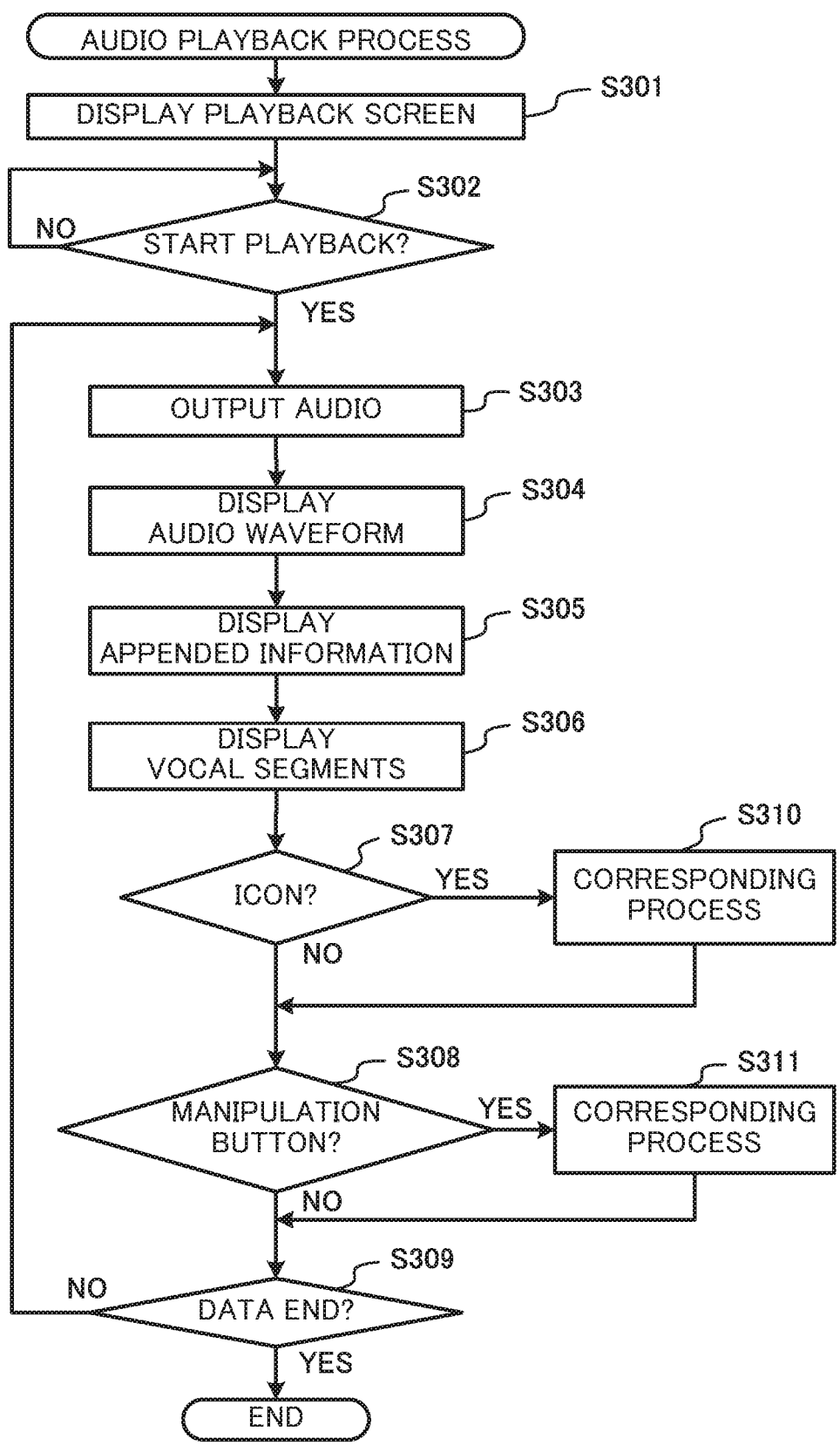
FIG. 12 is a flowchart for describing an audio playback process executed by the audio recording apparatus.

Next, an operation by which the audio recording apparatus 1 executes an audio playback process is described with reference to FIG. 12 and FIG. 13.

The user commands the launch of the audio recording and playback application program by manipulating the manipulator 13. The control device 18 reads the audio recording and playback application program from the memory device 17 and deploys the program to the RAM 16.

The user selects "audio playback mode," which is one of the plurality of operation modes with which the audio recording and playback application program is provided.

After the "audio playback mode" has been selected, the user selects the recording data 17b for which playback is desired, by manipulating the manipulator 13. When the recording data 17b is selected, the control device 18 starts the audio playback process shown in the flowchart of FIG. 12.

Figure 13:
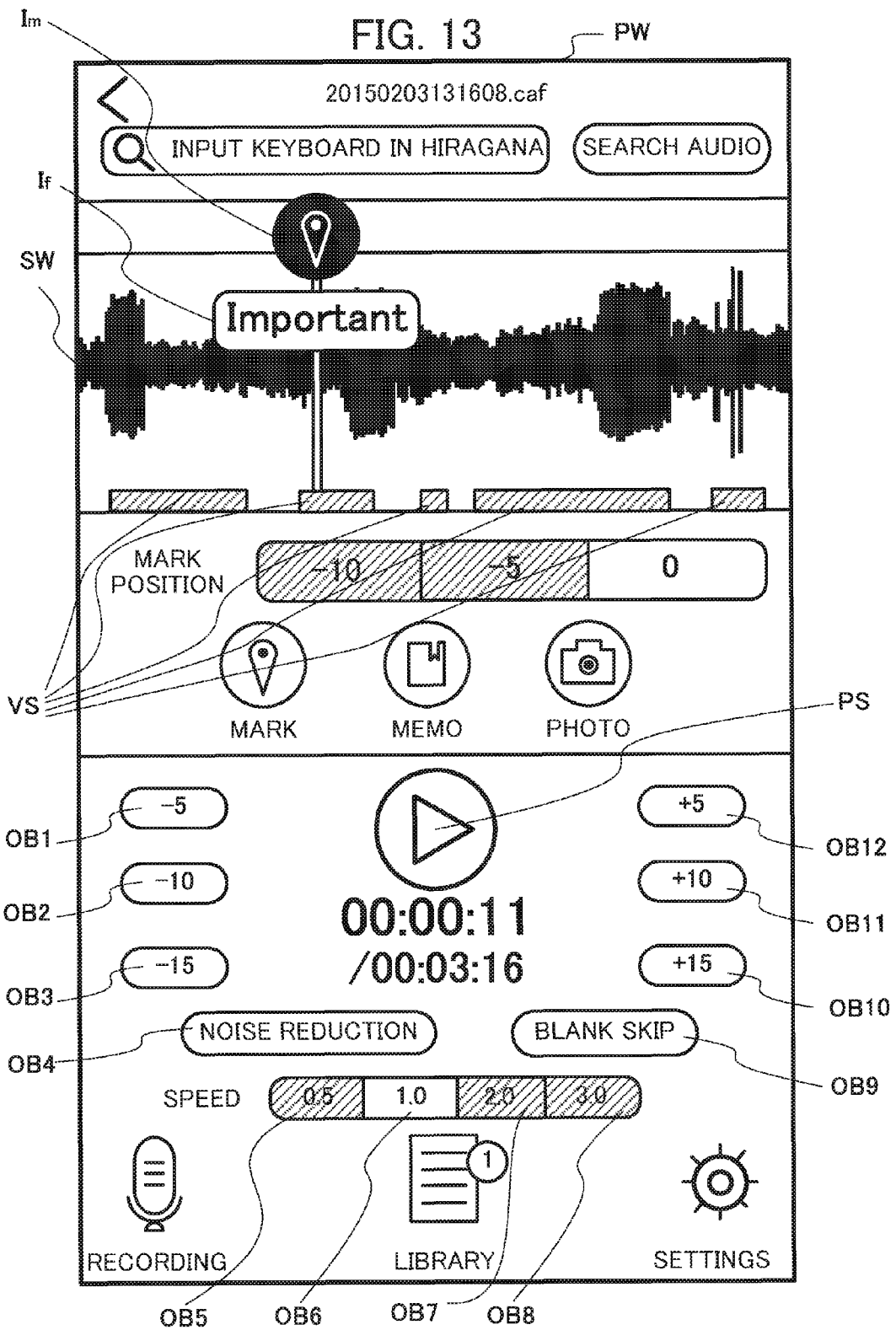
FIG. 13 is a drawing showing one example of a playback screen displayed by the audio recording apparatus.

When the audio playback process starts, first the playback screen PW shown in FIG. 13 is caused to be displayed on the display 12 (step S301), and a determination is made as to whether or not a playback start button PS has been pressed (step S302). When it is determined that the playback start button PS has not been pressed (step S302: No), the process returns to step S302.

When it is determined that the playback start button PS has been pressed (step S302: Yes), the recording data 17b selected by the user is read out from the memory device 17 and supplied to the audio output device 11, and audio is output on the basis of this recording data 17b (step S303).

The audio waveform display 101 reads the waveform drawing data corresponding to the recording data 17b from the memory device 17 and supplies this data to the display 12, and causes an audio waveform SW to be displayed on the basis of this waveform drawing data (step S304).

The information appender 105 supplies reads the display data 17c corresponding to the recording data 17b from the memory device 17 and supplies the display data 17c to the display 12, and displays the appended information (mark icon Im, memo icon If, photo icon Ip) on the basis of this display data 17c (step S305). For example, the information appender 105 displays the mark icon Im on the basis of the display data 17c, as shown in FIG. 13. At this time, the position where the mark icon Im is displayed is the same position as where the mark icon Im was displayed in step S213 of the flowchart of FIG. 5, during recording of the audio.

The analysis information display 107 reads the analysis information (information indicating the audio segment including voices emitted by people (vocal segment), out of the audio data included in the recording data 17b) corresponding to the recording data 17b from the memory device 17 and displays this analysis information on the display 12 along with the audio waveform SW (step S306). Specifically, the analysis information display 107 displays half-tone shaded icons VS indicating the vocal segments in the playback screen PW along with the audio waveform SW, as analysis information, as shown in in FIG. 13.

Next, a determination is made as to whether or not any out of the mark icon Im, the memo icon It or the photo icon Ip has been pressed (step S307). When the determination is that none has been pressed (step S307: No), the process moves to step S308.

When any out of the mark icon Im, the memo icon It and the photo icon Ip has been pressed (step S307: Yes), a process corresponding to the pressed button icon is executed (step S310) and the process then moves to step S308.

Specifically, when the mark icon Im is pressed, as the corresponding process the audio playback position skips to the position displayed by the mark icon Im that was pressed.

When the memo icon It is pressed, as the corresponding process the memo (text) corresponding to the memo icon It that was pressed is displayed.

When the phot icon Ip is pressed, as the corresponding process the photo corresponding to the photo icon Ip that was pressed is displayed.

Next, a determination is made as to whether or not any of the manipulation buttons OB1 to OB12 has been pressed (step S308). When it is determined that none of the manipulation buttons has been pressed (step S308: No), the process moves to step S309).

When it is determined that one of the manipulation buttons OB1 to OB12 has been pressed (step S308: Yes), a process corresponding to the manipulation button that was pressed is executed (step S311) and the process then moves to step S309.

Specifically, when one of the manipulation buttons OB1 to OB3 is pressed, as the corresponding process the playback position skips "−5 seconds", "−10 seconds" or "−15 seconds", respectively, back from the time of pressing.

When the manipulation button OB4 is pressed, as the corresponding process the noise is reduced.

When one of the manipulation buttons OB5 to OB8 is pressed, as the corresponding process the playback speed of the audio is changed to "0.5×", "1.0×", "2.0×" or "3.0×", respectively.

When the manipulation button OB9 is pressed, as the corresponding process the audio segments other than the vocal segments (the audio segments containing a voice produced by a person, out of the audio) are skipped.

When one of the manipulation buttons OB10 to OB12 is pressed, as the corresponding process the playback position skips to "15 seconds", "10 seconds" or "5 seconds", respectively, forward from the time of pressing.

In step S309, a determination is made as to whether or not the audio data has been played back to the end time. When it is determined that the audio data has not been played back to the end time (step S309: No), the process moves to step S303.

When it is determined that the audio data has been played back to the end time (step S309: Yes), the audio playback process concludes.

As described above, the audio recording apparatus 1 according to this exemplary embodiment displays appended information (the mark icon Im, the memo icon It and the photo icon Ip) with which the attribute information, memo (text) and image are associated, corresponding to the audio recorded immediately prior, during the recording of audio. When playing back recorded audio later, the user can specify locations that were missed during listening or locations containing important content, by referencing the appended information.

That is to say, the audio recording apparatus 1 according to this exemplary embodiment, in preparation for cases where recorded audio is later played back, can associate information (appended information) that can specify locations that were missed during listening or locations containing important information, with the audio recorded immediately prior, while recording audio. Accordingly, it is possible to improve usability by the user during audio recording.

(Second Exemplary Embodiment)

The audio recording apparatus 1 according to the first exemplary embodiment displays appended information (the mark icon Im, the memo icon It and the photo icon Ip) with which attribute information, a memo (text) or a photo were associated, along with the audio waveform SW displayed in the display 12, while recording audio.

There are cases in which the user wants to display information other than the appended information along with the audio waveform SW while recording audio.

Below, functions and operation of the audio recording apparatus 1 that displays appended information and analysis information acquired by analysis of the recorded audio, along with the audio waveform SW, while recording audio, is described.

The audio recording apparatus 1 according to this exemplary embodiment has a configuration that is generally in common with the audio recording apparatus 1 according to the first exemplary embodiment. However, the functions of the analyzer 106 and the analysis information display 107 differ in part.

The analyzer 106 according to the first exemplary embodiment acquired, as analysis information, information indicating the vocal segments by implementing a vocal segment detection process on the recorded audio, after recording of audio was concluded.

The analyzer 106 according to this exemplary embodiment executes the vocal segment detection process after recording of audio is concluded, and also acquires, as analysis information, information indicating provisional vocal segments by implementing a vocal segment detection pre-process on the audio in the recording, during recording of the audio.

The vocal segment detection pre-process and the provisional vocal segments are described in detail below.

In the vocal segment detection process, after recording of the audio is concluded, audio segments that include voices produced by people are detected, out of the audio, using a threshold value acquired on the basis of all audio data acquired until the end of recording. In contrast, in the vocal segment detection pre-process, audio segments that include voices produced by people are detected, out of the audio, during recording of the audio, using a threshold value acquired on the basis of audio data acquired to each point in time.

Although these are threshold values acquired on the basis of the same audio data, the threshold value used in the vocal segment detection pre-process has less audio data volume as a foundation for acquisition than the threshold value used in the vocal segment detection process, so there is a high possibility that this is an unsuitable threshold value. Accordingly, audio segments detected by the vocal segment detection process as audio segments containing voices produced by people have a higher possibility of being audio segments containing voices actually produced by people than the audio segments detected by the vocal segment detection pre-process as audio segments containing voices produced by people. Consequently, in order to distinguish the former from the latter, the former are termed "vocal segments" and the latter are termed "provisional vocal segments."

In addition, the analyzer 106 acquires, as analysis information, text indicating audio recognized through voice recognition targeting audio in the recording, during recording of audio.

In addition, the analyzer 106 executes spectral analysis targeting audio in the recording, during recording of the audio, and acquires, as analysis information, a sound spectrogram showing the results of the spectral analysis. The horizontal axis of the sound spectrogram is time, the vertical axis is frequency and the shading expresses the intensity of each frequency component.

The analysis information display 107 according to the first exemplary embodiment displayed analysis information along with the audio waveform SW displayed in the display 12, during playback of the audio. The analysis information display 107 according to this exemplary embodiment displays the analysis information along with the audio waveform SW displayed in the display 12, during recording of the audio.

Below, operations of the audio recording apparatus 1 according to this exemplary embodiment having the above-described configuration in executing the audio recording process are described with reference to FIG. 14 and FIG. 15.

The audio recording apparatus 1 according to this exemplary embodiment executes processes that are largely common with the audio recording process shown in the flowchart of FIG. 4, and the appended information display process shown in the flowchart of FIG. 5.

Figure 14:
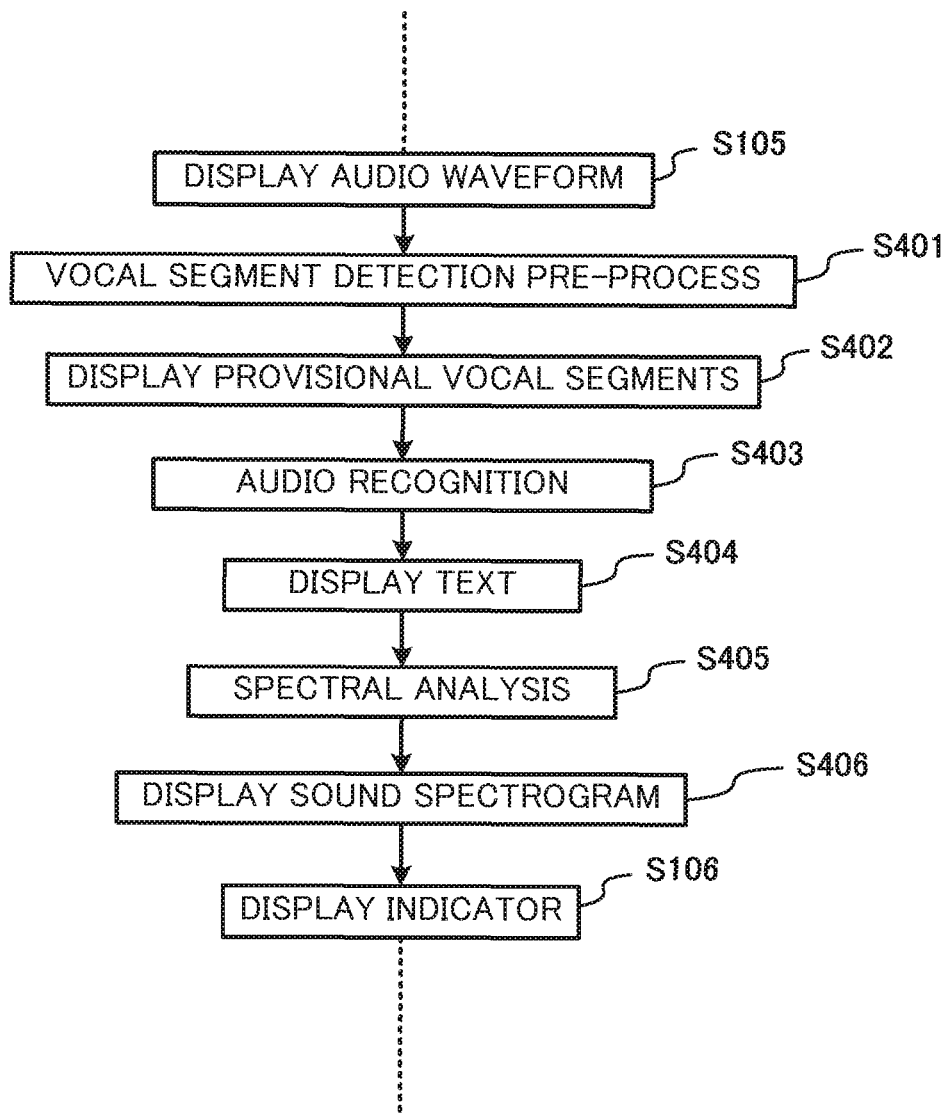
FIG. 14 is a flowchart for describing an audio recording process executed by an audio recording apparatus according to a second exemplary embodiment of the present disclosure.

However, the audio recording apparatus 1 according to this exemplary embodiment, after executing the process of step S105 of the flowchart of FIG. 4 and before executing the process of step S106, executes the process in steps S401 to S406 shown in the flowchart of FIG. 14.

Specifically, after the audio waveform display 101 executes the process of step S105 and has displayed the audio waveform SW in the recording screen RW on the display 12, the analyzer 106 executes an vocal segment detection pre-process targeting audio recorded by the recorder 10 in step S103 of the flowchart of FIG. 4, and acquires, as analysis information, information indicating provisional vocal segments (step S401).

Then, the analysis information display 107 displays information indicating the provisional vocal segments acquired as analysis information in step S401 along with the audio waveform SW displayed on the display 12 (step S402).

Specifically, the analysis information display 107 displays a half-tone shaded icon PVS indicating the provision vocal segments, along with the audio waveform SW, in the recording screen RW, as shown in FIG. 15.

Next, the analyzer 106 executes audio recognition targeting audio recorded by the recorder 10 in step S103, and acquires, as analysis information, text indicating the audio recognized by this audio recognition (step S403).

Then, the analysis information display 107 displays all of the text TX acquired as analysis information in step S403 along with the audio waveform SW displayed in the display 12, as shown in FIG. 15 (step S404).

Next, the analyzer 106 executes spectral analysis targeting the audio recorded by the recorder 10 in step S103, and acquires, as analysis information, a sound spectrogram indicating the results of the spectral analysis (step S405).

Then, the analysis information display 107 displays the sound spectrogram SP acquired as analysis information in step S405 along with the audio waveform SW displayed in the display 12, as shown in FIG. 15 (step S406).

After the process of step S406 has ended, the process moves to step S106 of the flowchart of FIG. 4.

The audio recording apparatus 1 according to this exemplary embodiment executes the vocal segment detection pre-process in step S401 and acquires, as analysis information, information showing the provisional vocal segments, and following this executes the vocal segment detection process in step S113 of the flowchart of FIG. 4 and acquires, as analysis information, information showing the vocal segments. The audio recording apparatus 1 supplies only analysis information indicating the vocal segments, out of the analysis information obtained by these processes, to the memory device 17 and stores this information in the memory device 17.

When the audio recording apparatus 1 according to this exemplary embodiment is executing the audio playback process, the analysis information display 107 displays information indicating the vocal segments on the basis of the analysis information stored in the memory device 17, but does not display information indicating the provisional vocal segments, which have a relatively high possibility of being inaccurate.

As described above, the audio recording apparatus 1 according to this exemplary embodiment displays the appended information and analysis information acquired by analyzing the recorded audio, along with the audio waveform SW, during recording of the audio.

That is to say, the audio recording apparatus 1 according to this exemplary embodiment, in preparation for when the recorded audio is later played back, can display the analysis information along with associating the appended information (information that can specify locations missed during listening or locations containing important content, when later playing back recorded audio) to the audio recorded immediately prior, while recording the audio. Accordingly, it is possible to improve usability by the user during audio recording.

The exemplary embodiments were described above, but the exemplary embodiments are examples and are not limiting to the scope of the present disclosure. Various applications of the exemplary embodiments of the present disclosure are possible, and all exemplary embodiments are included within the scope of the present disclosure.

In the above-described exemplary embodiments, the audio waveform display 101 through the analysis information display 107 realized by the recorder 10 through the memory device 17 and the control device 18 were provided in a single device (the audio recording apparatus 1). The audio waveform display 101 through the analysis information display 107 realized by the recorder 10 through the memory device 17 and the control device 18 may be provided in independent devices. For example, it would be fine for the recorder 10 to be provided in a given device (for example, a headset), for the display 12 to be provided in a separate device (for example, a television), and for the rest of the configuration (the audio output device 11, the manipulator 13 through the memory device 17, and the audio waveform display 101 through the analysis information display 107) to be provided in still another device (for example, a notebook personal computer that, along with acquiring recorded audio from the headset, controls the television and causes various images to be displayed).

With the above-described exemplary embodiments, the audio recording apparatus 1 displays the appended information at a position going back by the go-back time from the base time, on the audio waveform SW displayed on the display 12. When this occurs, the base time was the time when the user pressed any out of the mark button Bm, the memo button Bt and the photo button Bp. The base time can be a time when the user accomplished an arbitrary prescribed manipulation. For example, the time when the user presses the indicator button $B_0$, $B_5$ of $B_{10}$ (the time when the receiver 102 received the indicated go-back time) may be taken as the base time.

With the above-described exemplary embodiments, the mark icon Im, the memo icon It and the photo icon Ip were cited and described as examples of appended information. The appended information is not limited to this, for arbitrary information would be fine. For example, the appended information may be an icon associated with audio data.

With the above-described exemplary embodiments, the memo icon It was associated with a memo (text) the user input after pressing the memo button Bt. The memo icon It can be associated with arbitrary text. For example, it would be fine to associate with the memo icon It text acquired in advance from outside and stored.

With the above-described exemplary embodiments, the photo icon Ip was associated with an image generated by the imaging device 14 in accordance with a determination that the photo button Bp had been pressed. The photo icon Ip is not limited to this and can be associated with an arbitrary image. For example, it would be fine to associate with the photo icon Ip a photo acquired in advance from outside and stored.

With the above-described exemplary embodiments, the emphasis display 104 displays the indicator corresponding to the go-back time received as the go-back time indicated by the receiver 102 bolder than indicators corresponding to other go-back times. The emphasis display 104 can display the indicator corresponding to the time received as the go-back time in a state of greater emphasis than other indicators, through an arbitrary other method. For example, the indicator display 103 may display the indicator corresponding to the time received as brighter than other indicators. In addition, it is possible to display the indicator corresponding to the time received in a different color than the other indicators.

With the above-described exemplary embodiments, the audio recording apparatus according to the present disclosure was described as a separate apparatus having independent functions, but it would be fine to realize this through an arbitrary electronic apparatus such as a smartphone, a computer, a voice recorder, a digital camera, a personal digital assistant (PDA) and/or the like.

Specifically, it is possible to realize the audio recording apparatus according to the present disclosure by storing and distributing a program for causing a smartphone, computer, voice recorder, digital camera, PDA and/or the like to operate as the audio recording apparatus according to the present disclosure on a recording medium readable by such electronic devices (for example, a memory card, a compact disc read-only memory (CD-ROM), a digital versatile disc read-only memory (DVD-ROM) and/or the like), and to install the program.

Or, the above-described program may realize the audio recording apparatus according to the present disclosure by being stored on a memory device (for example, a disk device and/or the like) possessed by a server device on a communication network such as the Internet and/or the like, and by a smartphone, computer, voice recorder, digital camera, PDA and/or the like downloading this program.

In addition, when the functions of the audio recording apparatus according to the present disclosure are realized by cooperation or sharing by an operating system (OS) and application programs, it would be fine for the application program portion alone to be stored on a recording medium or memory device.

In addition, it would be fine for the application program to be overlaid on carrier waves and distributed via a communication network. For example, it would be fine for the application program to be posted on a bulletin board system (BBS) on a communication network and for the application program to be distributed via the network. Furthermore, it would be fine for the audio device according to the present disclosure to be realized by this application program being installed on and operating on a computer, and by executing this the same as other application programs under control of the OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An audio recording apparatus comprising:
    a processor configured to execute the following processes:
    a process of receiving a process-starting manipulation by a user;
    a process of recording audio occurring, from a start time of the process-staring operation in response to the reception of the process-starting manipulation while associating the audio with a recording time that starts at the start time of the process-starting operation;
    a process of displaying an audio waveform of the audio recorded from the start time at a location of a display corresponding to the recording time;
    a process of displaying: an indicator at a current time point corresponding to a current time of the audio waveform, an indicator at a first go-back time point corresponding to a time earlier by the length of a first go-back time than the current time, and an indicator at a second go-back time point corresponding to a time earlier by the length of a second go-back time than the current time, the second go-back time being different from the first go-back time in length from the current time;
    a process of receiving optional selection of one of the first go-back time point and the second go-back time point in response to manipulation by a user;
    a process of appending appended information to the audio while associating the appended information with an audio-recording time point corresponding to the one of the first go-back time point and the second go-back time point that is selected in response to the manipulation by the user.

2. The audio recording apparatus according to claim 1, wherein, in the process of displaying the indicators, the audio waveform is movably displayed on the display with a lapse of time from the start time of the process-starting operation and the respective indicators are positioned at the current time point, the first go-back time point, and the second go-back time point of the audio waveform by movement of the audio waveform.

3. The audio recording apparatus according to claim 1, wherein, in the process of displaying the indicators, the indicator indicated at the one selected from the first go-back time point and the second go-back time point and the indicator indicated at the other of the first go-back time point and the second go-back time point, the other of the locations being not selected, are displayed in a manner different from each other.

4. The audio recording apparatus according to claim 1, wherein the appended information is at least one out of: information indicating attributes, text information, and image information, and, in the process of appending the appended information to the audio, displaying icons that differ in accordance with the various types of information.

5. The audio recording apparatus according to claim 1, wherein the processor is further configured to execute the following processes:
    a process of analyzing the audio to acquire analysis information on the audio; and
    a process of displaying the analysis information along with the audio waveform on the display.

6. The audio recording apparatus according to claim 5, wherein the analysis information is at least one out of information indicating audio segments containing voices produced by people and a sound spectrogram showing spectral analysis results targeting the audio or text showing audio recognized by audio recognition targeting the audio, out of the audio.

7. An audio recording method including the following steps:
  receiving a process-starting manipulation by a user;
  recording audio occurring from a start time of a process-starting operation in response to the reception of the process-starting manipulation while associating the audio with a recording time that starts at the start time of the process-starting operation;
  displaying an audio waveform of the audio recorded from the start time at a location of a display corresponding to the recording time;
  displaying an indicator at a current time point corresponding to a current time of the audio waveform, an indicator at a first go-back time point corresponding to a time earlier by a length of first go-back time than the current time, and an indicator at a second go-back time point corresponding to a time earlier by a length of second go-back time than the current time, the second go-back time being different from the first go-back time in length from the current time;
  receiving optional selection of one of the first go-back time point and the second go-back time point in response to manipulation by a user; and
  appending appended information to the audio while associating the appended information with an audio-recording time point corresponding to the one of the first go-back time point and the second go-back time point that is selected in response to the manipulation by the user.

8. The audio recording method according to claim 7, wherein, in the step of displaying the indicators, movably displaying the audio waveform on the display with a lapse of time from the start time of the process-starting operation, and positioning the respective indicators at the current time point, the first go-back time point, and the second go-back time point of the audio waveform by movement of the audio waveform.

9. The audio recording method according to claim 7, wherein, in the step of displaying the indicators, displaying the indicator indicated at the one selected from the first go-back time point and the second go-back time point in a manner differently from displaying the indicator indicated at the other of the first go-back time point and the second go-back time point, the other of the locations being not selected.

10. The audio recording method according to claim 7, wherein the appended information is at least one out of information indicating attributes, text information and image information, and, the step of appending the appended information to the audio includes displaying icons that differ in accordance with the various types of information.

11. The audio recording method according to claim 7, further comprising:
  analyzing the audio;
  acquiring analysis information on the audio based on the analysis thereof; and
  displaying the analysis information along with the audio waveform on the display.

12. The audio recording method according to claim 11, wherein the analysis information is at least one out of information indicating audio segments containing voices produced by people and a sound spectrogram showing spectral analysis results targeting the audio or text showing audio recognized by audio recognition targeting the audio, out of the audio.

13. A non-transitory recording medium on which is recorded a program for causing a computer of an audio recording apparatus to execute the following processes:
  a process of receiving a process-starting manipulation by a user;
  a process of recording audio occurring from a start time of a process-starting operation in response to the reception of the process-starting manipulation while associating the audio with a recording time that starts at the start time of the process-starting operation;
  a process of displaying an audio waveform of the audio recorded from the start time at a location of a display corresponding to the recording time;
  a process of displaying an indicator at a current time point of the audio waveform corresponding to a current time, an indicator at a first go-back time point of the audio waveform corresponding to a time earlier by a length of first go-back time than the current time, and an indicator at a second go-back time point of the audio waveform corresponding to a time earlier by a length of second go-back time than the current time, the second go-back time being different from the first go-back time in length from the current time;
  a process of receiving optional selection of one of the first go-back time point and the second go-back time point in response to manipulation by a user; and
  a process of appending appended information to the audio while associating the appended information with an audio-recording time point corresponding to the one of the first go-back time point and the second go-back time point that is selected in response to the manipulation by the user.

14. The non-transitory recording medium according to claim 13, wherein, in the process of displaying the indicators, movably displaying the audio waveform on the display with a lapse of time from the start time of the process-starting operation, and positioning the respective indicators at the current time point, the first go-back time point, and the second go-back time point of the waveform by movement of the audio waveform.

15. The non-transitory recording medium according to claim 13, wherein, in the process of displaying the indicators, displaying the indicator indicated at the one selected from the first go-back time point and the second go-back time point in a manner differently from displaying the indicator indicated at the other of the first go-back time point and the second go-back time point, the other of the locations being not selected.

16. The non-transitory recording medium according to claim 13, wherein the appended information is at least one out of information indicating attributes, text information, and image information, and, in the process of appending the appended information to the audio, displaying icons that differ in accordance with the various types of information.

17. The non-transitory recording medium according to claim 13, wherein the non-transitory recording medium stores a program that further causes execution of:
  a process of analyzing the audio;
  acquiring analysis information on the audio based on the analysis thereof; and displaying the analysis information along with the audio waveform on the display.

* * * * *